United States Patent [19]

Rothe et al.

[11] Patent Number: 5,239,243

[45] Date of Patent: Aug. 24, 1993

[54] CRT BEAM DEFLECTION SYSTEM

[75] Inventors: Rick Rothe; Thomas A. Sturm, both of Littleton, Colo.

[73] Assignee: Alliant Techsystems, Inc.,, Littleton, Colo.

[21] Appl. No.: 955,047

[22] Filed: Oct. 1, 1992

[51] Int. Cl.⁵ ............................ G09G 1/04; H01J 29/56
[52] U.S. Cl. ..................................... 315/367; 315/370; 358/485
[58] Field of Search ...................... 315/367, 370, 371; 358/485

[56] References Cited

U.S. PATENT DOCUMENTS

| | | | |
|---|---|---|---|
| 3,809,948 | 5/1974 | Chubb | 315/367 |
| 4,314,179 | 2/1982 | Tooyama et al. | 315/12 |
| 4,670,778 | 6/1987 | Miyakawa | 358/75 |
| 4,754,334 | 6/1988 | Krix et al. | 358/244 |

Primary Examiner—Gregory C. Issing
Attorney, Agent, or Firm—James R. Young

[57] ABSTRACT

Disclosed is a system having a memory mapped deflection to control the position of an electron beam within a CRT used to project a color image onto a photographic medium for printing. A horizontal position counter is incremented at a linear rate, and the counter value is translated, using a translation table stored in memory, into a current used to drive the yoke of the CRT. The translation introduces non-linearities into the output voltage which results in a linear forward sweep across the CRT. A sweep direction signal is used as an address bit of the translation table, to allow an optimized retrace motion profile which results in an improved linear beam motion across the face of the CRT during the forward sweep immediately following retrace.

2 Claims, 6 Drawing Sheets

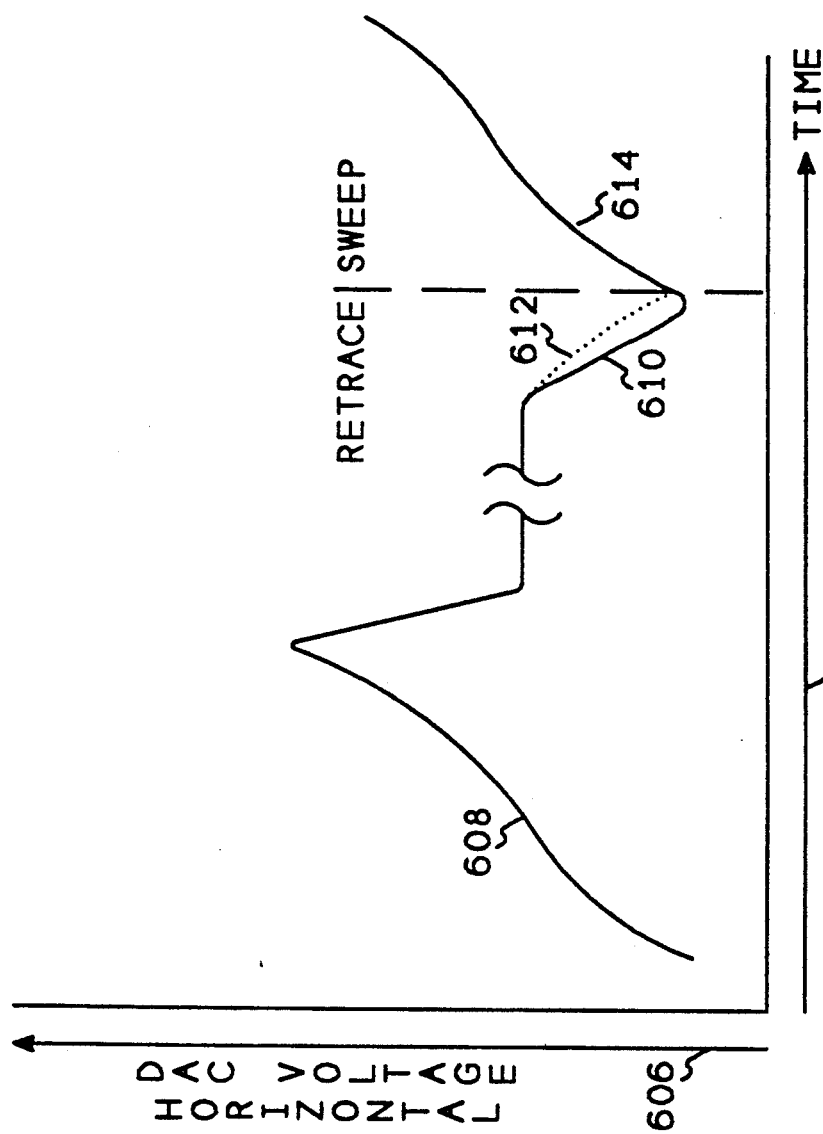

CRT BEAM DEFLECTION SYSTEM

CROSS REFERENCE TO RELATED APPLICATIONS

This application is related to U.S. Pat. No. 5,084,656 issued to Sturm, et al. Jan. 28, 1992, entitled "CRT Beam Deflection Control System".

FIELD OF THE INVENTION

This invention relates to printers for computer systems and more particularly to Cathode Ray Tube (CRT) display systems within such printers. Even more particularly, the invention relates to controlling the beam deflection within a CRT display system of such a printer.

BACKGROUND OF THE INVENTION

Variable speed photographic process printers that utilize CRT's for media exposure typically use linear deflection amplifiers to sweep the electron beam across the face of the CRT. A deflection cycle normally consists of a sweep, retrace, and hold period. During the sweep period, the CRT is unblanked and the beam is driven horizontally at a given vertical position while being modulated to expose the media. During the first half of the retrace period, the CRT is blanked and the beam is returned to a home position to wait for the start of the next sweep. Thus, the sweep and the first half of the retrace periods are typically fixed time intervals. The beam is then held in the home position for the hold period until a new sweep is initiated, therefore, the hold period is a variable time interval dependent on the print speed. When the next sweep is initiated, the second half of retrace is completed, sweeping the trace to one side of the CRT, and the forward sweep then follows immediately.

Prior art system have provided a means to produce a non-linear CRT yoke drive current in order to cause a linear beam sweep in the forward direction. This is necessary because of the inherent deflection and CRT geometric non-linearities, and amplifier slew limitations due to the inductive load presented by the yoke coil. To produce the non-linear current, prior art systems use a translation table, usually implemented in a read-only-memory, to translate a linear horizontal position counter into the non-linear current. This translation table provides control of the position of the electron beam, since a different current may be output for each position of the beam as it sweeps across the face of the CRT.

Prior art systems use the same translation table for both the forward and retrace sweeps, therefore the non-linearity for the forward sweep is mirrored in the retrace. The retrace profile thus influences the smoothness of beam motion during the forward sweep immediately following the retrace causing detectable non-linearities. The fact that the sweep and retrace profiles are inter-related complicates the objective of accurate linear beam velocity on the face of the CRT.

It is thus apparent that there is a need in the art for an improved system that uses independent sweep and retrace motion profiles to improve the beam behavior in the early period of the forward sweep following retrace. The independent profiles allow the retrace to be used to improve and enhance forward sweep motion after the beam turn around. The present invention meets this and other needs.

This application is related to U.S. Pat. No. 5,084,656 issued to Sturm, et al. Jan. 28, 1992, entitled "CRT Beam Deflection Control System", which is specifically incorporated herein by reference for all that is disclosed and taught therein.

SUMMARY OF THE INVENTION

It is an aspect of the present invention to correct the electron beam sweep motion within a cathode ray tube (CRT) of a photographic type printer.

Another aspect of the invention is to provide independent beam correction information for forward and retrace sweeps of the electron beam within the CRT.

The above and other aspects of the invention are accomplished in a system having memory mapped deflection including a vertical register and a horizontal deflection controller to control the position of an electron beam within a CRT used to project a color image onto a photographic medium for printing. When data is being displayed on the CRT, the beam is positioned vertically to the desired color phosphor row by the vertical register and then swept across the face of the CRT by the horizontal deflection controller while the data is used to modulate the beam.

The horizontal deflection controller contains a horizontal position counter which is incremented at a linear rate. The value of this counter is translated into a current used to drive the yoke of the CRT using a translation table stored in memory, either a read-only-memory or a RAM. While the translation is being performed, non-linearities are introduced into the output current which result in a linear sweep across the CRT face.

To decouple the sweep and retrace profiles, the present invention uses a sweep direction bit as an address bit of the translation table. This allows the table to have separate outputs for forward sweep and retrace, allowing for optimized beam motion during the sweep following the turn around from retrace.

BRIEF DESCRIPTION OF THE DRAWINGS

The above and other objects, features, and advantages of the invention will be better understood by reading the following more particular description of the invention, presented in conjunction with the following drawings, wherein:

FIG. 6 shows a voltage sweep timing diagram illustrating different sweep voltages in forward sweep and retrace.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
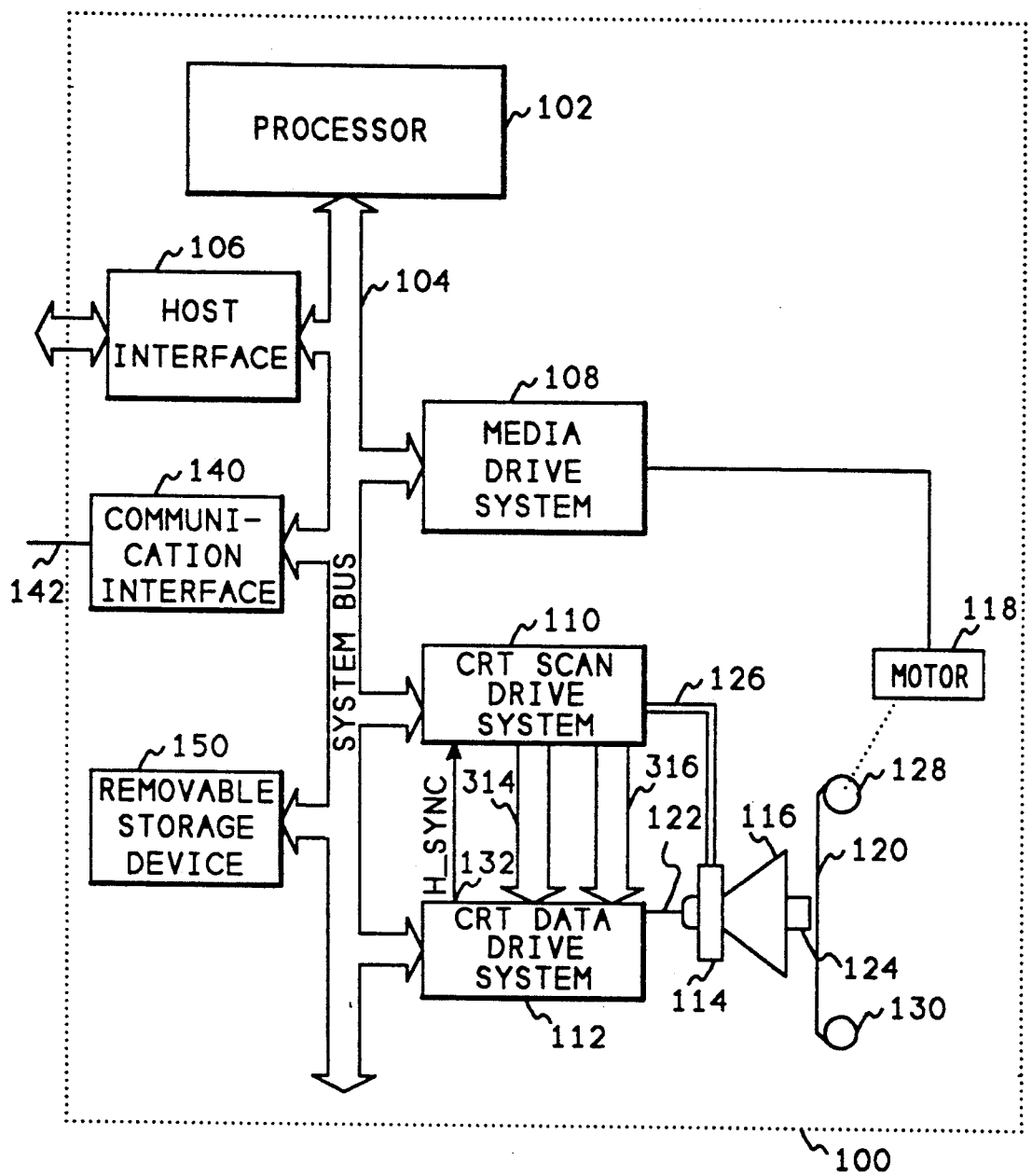
FIG. 1 shows a block diagram of a printer incorporating the present invention.

FIG. 1 shows a block diagram of a printer incorporating the present invention. Referring now to FIG. 1, a printer 100 contains a processor 102 which communicates to other components of the system over a system bus 104. The processor 102 uses a host interface 106 to receive data from a host system (not shown), and the processor 102 stores this data in a CRT data drive system 112. The output 122 of the CRT data drive system 112 is connected to a CRT 116 and used to modulate the electron beam within the CRT 116. Data displayed on the face of the CRT 116 is conducted through a CRT fiber optic faceplate 124 to print media 120. The print media 120 is a photosensitive media capable of recording the image displayed on the CRT and conducted through the CRT fiber optic faceplate 124. Deflection of the electron beam of the CRT 116 is controlled by a CRT scan drive system 110 whose output 126 is connected to a yoke 114 of the CRT 116. The CRT data drive system 112 controls the start of each horizontal trace through an H_SYNC signal 132, and receives scan timing information over a vertical address bus 314 and a horizontal address bus 316. The present invention is incorporated within the CRT scan drive system 110.

The print media 120 is moved by a paper roll 128 which is powered by a motor 118. The motor 118 is operated by a media drive system 108 which is controlled over the system bus 104 by the processor 102.

A communications interface 140 is used to input EEPROM data into the printer, and removable storage device 150 is used to load EEPROM data. Either of these devices can be used to load data from an external source. The EEPROM, or Electrically Erasable Programmable Read Only Memory, is used to set the sweep and retrace profiles, which will be described below.

Operation of the system begins when data is received over the host interface 106. The processor 102 takes the data from the host interface 106 and stores the data in the CRT data drive system 112. The CRT data drive system 112 converts the data to a series of pixels of the appropriate color to produce the appropriate image desired. The media drive system 108 is then used to position the media 120 in front of the red, green, and blue phosphor stripes on the face of the fiber optic faceplate 124. The CRT scan drive system 110 is then activated to scan the electron beam across the appropriate phosphor line while the CRT data drive system 112 modulates the CRT beam intensity to expose the line of the print media. The print media is then moved a fixed distance, and the process is repeated for one of the other colors. One line of data is complete after all three phosphors—red, green, and blue—have been scanned into the line.

Figure 2:
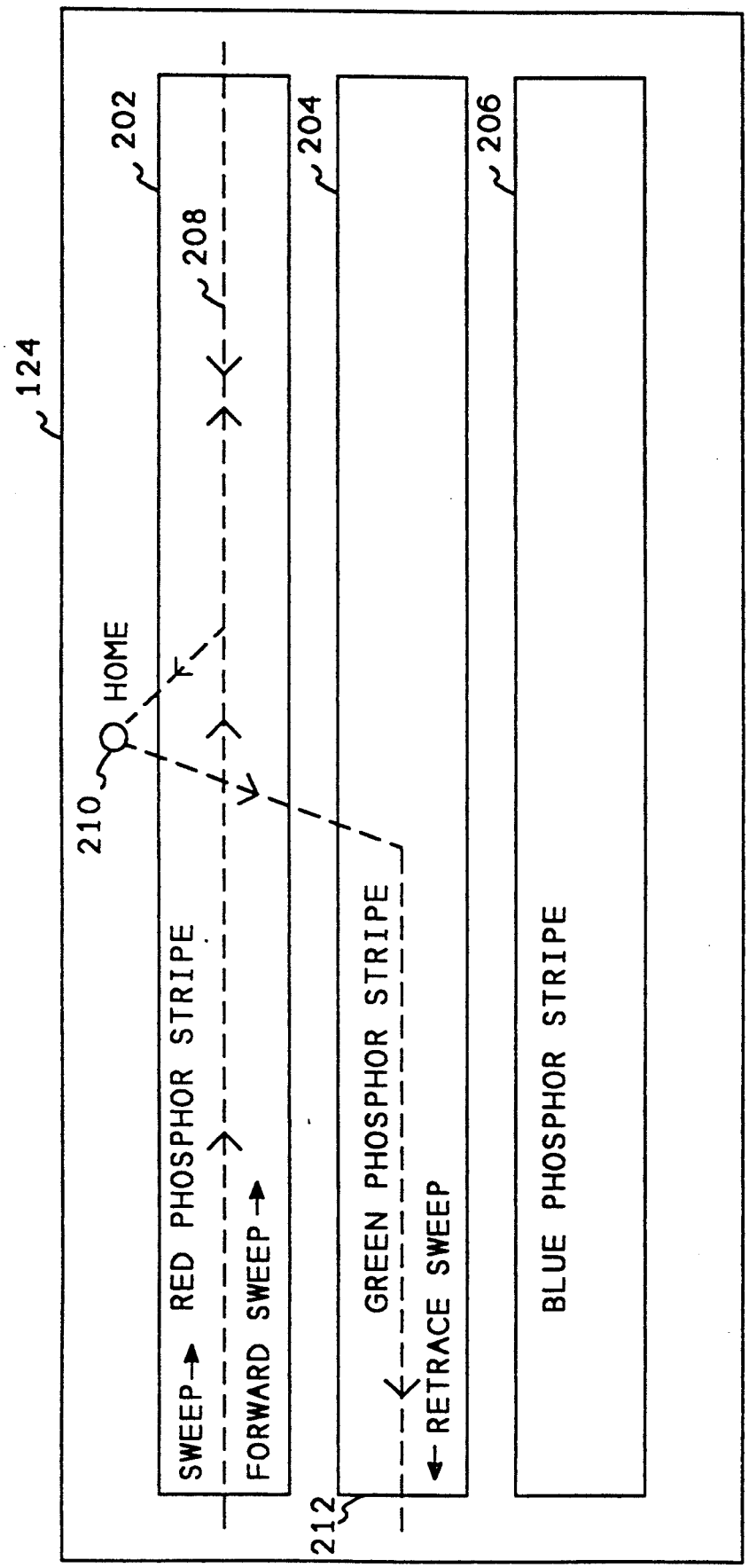
FIG. 2 shows a diagram of the face of the CRT used with the present invention.

FIG. 2 shows a diagram of the face of the fiber optic faceplate 124, and illustrates the three phosphor stripes as well as the home position of the CRT electron beam. Referring now to FIG. 2, the CRT fiber optic faceplate 124 contains a red phosphor stripe 202, a green phosphor stripe 204, and a blue phosphor stripe 206. A dotted line 208 shows the sweep and retrace lines for the electron beam across the face of the CRT 116 (FIG. 1) and the fiber optic faceplate 124. During retrace of the CRT beam 208, the beam is directed to a home position 210 which is located above the three phosphor stripes, and the beam remains in this position until the next phosphor stripe is to be scanned. When a new vertical position is to be scanned, the beam moves from the home position 210 to the left side 212 to begin the next sweep. Since the next sweep is always immediately preceded by the completion of the retrace, the initial conditions for a sweep are consistent, however, the present invention improves forward sweep linearity by independently controlling the motion profile of the beam during the retrace, and particularly during the completion of the retrace, just prior to the start of the forward sweep.

Figure 3:
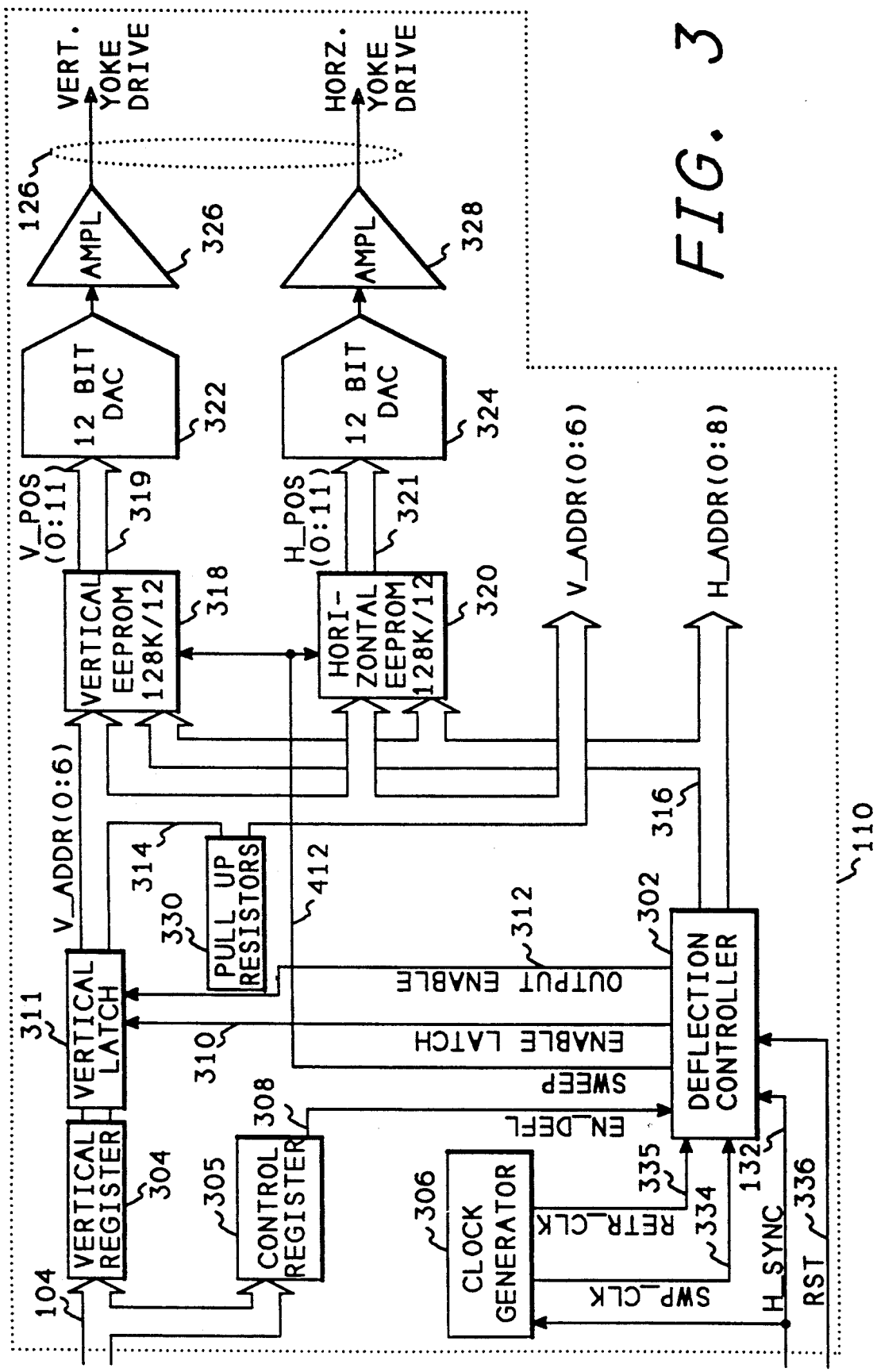
FIG. 3 shows a block diagram of the CRT scan drive system of FIG. 1.

FIG. 3 shows a block diagram of the CRT scan drive system 110 (FIG. 1) incorporating the present invention. Referring now to FIG. 3, the CRT scan drive system 110 contains a deflection controller 302 which creates the data necessary to cause a sweep and retrace of the CRT beam, and to place the CRT beam into the home position 210 (FIG. 2). A vertical register 304 receives a vertical address from the CPU over the system bus 104. The vertical address is used to select either a red, green, or blue phosphor stripe on the face of the CRT 116 (FIG. 1). The vertical address is transferred to vertical latch 311 by an enable latch signal 310. The output V_ADDR 314 of the vertical latch 311 is a seven bit bus that is connected to a vertical EEPROM 318. V_ADDR 314 also connects to a horizontal EEPROM 320. The output of the deflection controller 302 is a nine bit H_ADDR bus 316 which is also connected to the vertical EEPROM 318 and the horizontal EEPROM 320. Although not shown in FIG. 3, the system bus 104 (FIG. 1) also connects to the Vertical EEPROM 318 and the horizontal EEPROM 320, to allow data to be loaded into the EEPROMs.

The deflection controller 302 also outputs a SWEEP signal 412 which indicates whether the beam is sweeping in a forward direction or performing a retrace. SWEEP signal 412 is a logic 1 when the beam is sweeping forward across the CRT, and is logic 0 otherwise.

Data on the V_ADDR bus 314, the H_ADDR bus 316, and the sweep signal 412, are converted by the vertical EEPROM 318 into a twelve bit vertical position signal V_319 which is connected to a twelve bit D to A converter 322. The output of the D to A converter is amplified by an amplifier 326 and connected through signal 126 to the vertical yoke drive on the CRT 116. Data on the V_ADDR bus 314 and the H_ADDR bus 316, as well as the sweep signal 412, are also connected to the horizontal EEPROM 320. The horizontal EEPROM 320 converts these three sets of bits values into a twelve bit horizontal position value H_POS 321 which is connected to a horizontal position twelve bit D to A converter 324. The output of the horizontal position D to A converter 324 is amplified by amplifier 328 and connected through signal 126 to the horizontal drive yoke. The vertical drive yoke signal and the horizontal drive yoke signal comprise the output 126 of the CRT scan drive system 110 (FIG. 1).

Because the vertical EEPROM 318 and the horizontal EEPROM 320 each receive both the vertical and horizontal address busses, each individual location on the face of the CRT can be independently controlled. This provides complete control of the electron beam dynamics as the electron beam moves across the face of the CRT. Since these EEPROMS are also addressed by the sweep signal 412, the electron beam dynamics are independently controllable for both the forward sweep direction and retrace. This allows the beam to be precisely controlled during retrace prior to the beam being turned around at the start of the forward sweep. This precise retrace control provides for optimized control of the linearity of the beam at the start of the forward sweep.

Figure 4:
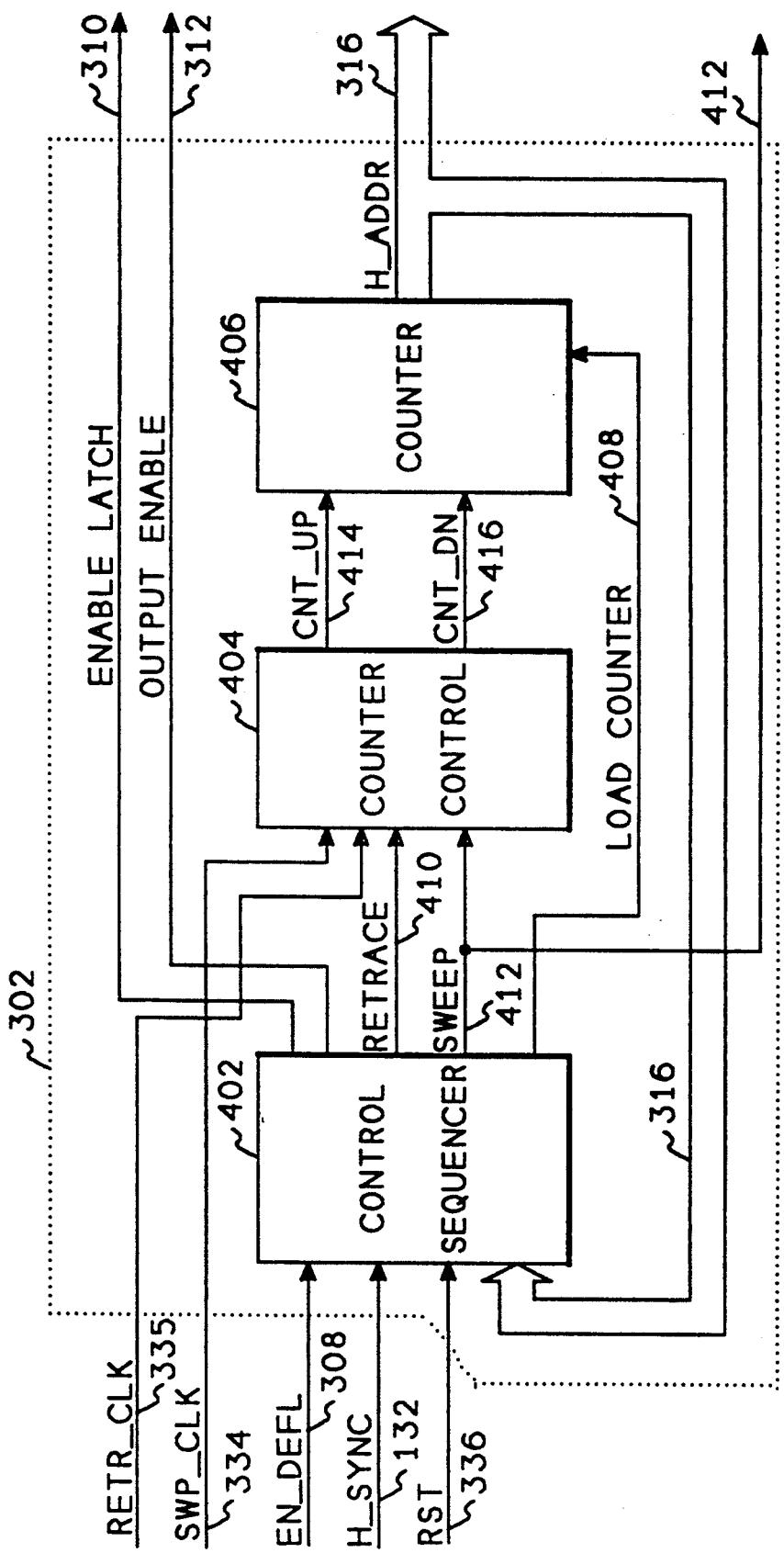
FIG. 4 shows a block diagram of the deflection controller of FIG. 3.

FIG. 4 shows a block diagram of the deflection controller 302 of FIG. 3. Referring now to FIG. 4, the deflection controller 302 contains a control sequencer 402 which controls all the functions within the deflection controller 302. The control sequencer 402 sends a RETRACE signal 410 and a SWEEP signal 412 to a counter control circuit 404. The counter control circuit 404 controls the up or down counting of a counter 406 through a pair of signals CNT_UP 414 and CNT_DN 416. A LOAD COUNTER signal 408 is sent from the control sequencer 402 to the counter 406 to cause it to load a preset value. The output of the counter 406 is the nine bit H_ADDR bus 316 which was described above with respect to FIG. 3. The H_ADDR bus 316 also connects to the control sequencer 402 so that the control sequencer 402 can determine the count value in the counter 406. The operation of the control sequencer, counter control and counter are described in U.S. Pat. No. 5,084,656, described above.

Figure 5:
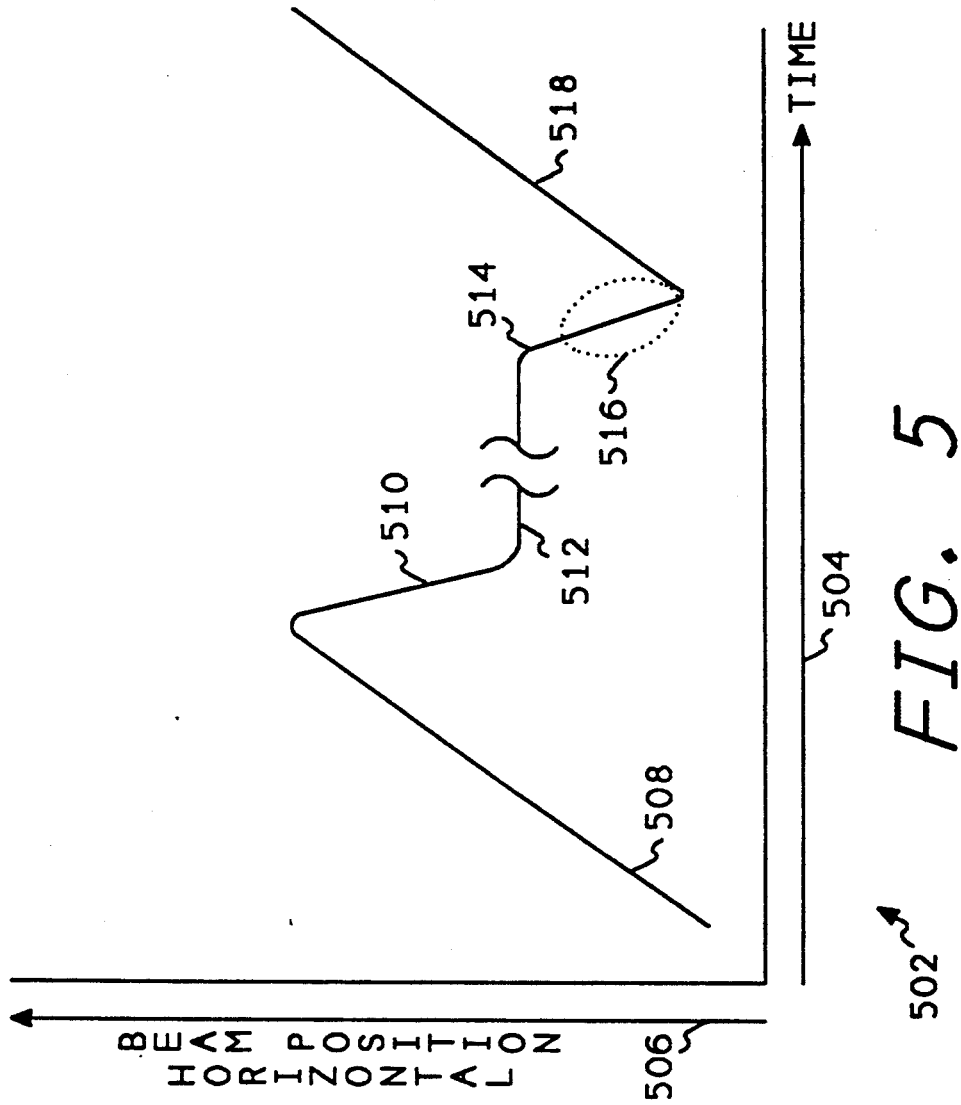
FIG. 5 shows a sweep timing diagram of a sweep, including retrace.

FIG. 5 shows a timing diagram of a forward sweep and retrace signals, Referring now to FIG. 5, timing diagram 502 shows sweep position over time. When a forward sweep 508 starts, the beam is swept across the face of the CRT. The first part of retrace 510 sweeps the beam back to the center of the CRT where it remains for the hold period. While the beam is at the center, it is positioned vertically to the home position 210 (FIG. 2) to prevent unwanted exposure of the media.

When a new sweep is desired, the retrace moves into the second part 514 where the beam is swept to the left side of the CRT. During this part of retrace, shown by dotted line 516, the retrace motion is modified in order to make the next sweep 518 linear. The retrace motion is modified by the horizontal EEPROM 320 which is being controlled by the sweep bit 412 as well as the H_ADDR bits 316 to select a separate data space to be used during retrace.

FIG. 6 shows a diagram of the output voltage of the DAC 324 when using the system of the present invention. Referring now to FIG. 6, chart 602 shows a timing diagram of sweep voltage 606, output by the DAC 324, and time 604. Trace 608 shows the non-linear voltage required to produce the linear trace 508 and 518 (FIG. 5). During retrace, if the translation table were the same as the forward sweep, the sweep voltage will be as shown by dotted line 612. Because of the sweep bit 412 used as an address bit to the horizontal EEPROM 320, and vertical EEPROM 318, the retrace can be adjusted independently, resulting in the trace 610 which optimizes the smoothness of the forward sweep.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A CRT beam control system for controlling movement of an electron beam used to illuminate a phosphor area on the face of the CRT, said system comprising:
    deflection controller means for sending a horizontal position address that varies from a left most address on the face of the CRT to a right most address on the face of the CRT, and for sending a sweep direction signal that indicates whether said horizontal position address is changing in a manner to cause said electron beam to perform a forward sweep or said horizontal position address is changing in a manner to cause said electron beam to perform a retrace sweep;
    translation means responsive to said horizontal position address and said sweep direction signal for translating said horizontal position address and said sweep direction signal into an output signal representative of a location defined by said horizontal position address and said sweep direction signal, whereby said translation means output signal provides a different output for forward sweep and retrace sweep;
    conversion means for converting said output signal into a drive current; and
    yoke means responsive to said drive current to move said electron beam to a position defined by said output of said translation means.

2. The CRT beam control system of claim 1 wherein said sweep direction signal has one binary value when a forward sweep is being performed, and has another binary value at all other times.

* * * * *